(12) United States Patent
Zhou et al.

(10) Patent No.: US 11,652,720 B2
(45) Date of Patent: May 16, 2023

(54) ALLOCATING CLOUD RESOURCES IN ACCORDANCE WITH PREDICTED DEPLOYMENT GROWTH

(71) Applicant: Microsoft Technology Licensing, LLC, Redmond, WA (US)

(72) Inventors: Shandan Zhou, Kenmore, WA (US); John Lawrence Miller, Redmond, WA (US); Christopher Cowdery, Redmond, WA (US); Thomas Moscibroda, Bellevue, WA (US); Shanti Kemburu, Sammamish, WA (US); Yong Xu, Beijing (CN); Si Qin, Beijing (CN); Qingwei Lin, Beijing (CN); Eli Cortez, Woodinville, WA (US); Karthikeyan Subramanian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 16/578,199

(22) Filed: Sep. 20, 2019

(65) Prior Publication Data
US 2020/0387401 A1    Dec. 10, 2020

Related U.S. Application Data

(60) Provisional application No. 62/858,190, filed on Jun. 6, 2019.

(51) Int. Cl.
*G06F 9/50* (2006.01)
*G06F 9/54* (2006.01)
(Continued)

(52) U.S. Cl.
CPC .............. *G06F 9/5011* (2013.01); *G06F 8/60* (2013.01); *G06F 9/5027* (2013.01); *G06F 9/544* (2013.01);
(Continued)

(58) Field of Classification Search
CPC ...... G06F 9/5011; G06F 9/5027; G06F 9/544; G06F 8/60; G06N 20/00; G06K 9/6256; G06K 9/6267
See application file for complete search history.

(56) References Cited

U.S. PATENT DOCUMENTS 9,038,090 B1 * 5/2015 Peeters ................. G06F 9/5083
718/105
9,823,941 B2 * 11/2017 Cropper ................ G06F 9/5077
(Continued)

FOREIGN PATENT DOCUMENTS

EP    3470983 A1    4/2019

OTHER PUBLICATIONS

"International Search Report and Written Opinion Issued in PCT Application No. PCT/US20/029177", dated Jul. 1, 2020, 13 Pages.
(Continued)

*Primary Examiner* — Jacob D Dascomb

(57) ABSTRACT

The present disclosure relates to systems, methods, and computer readable media for predicting deployment growth on one or more node clusters and selectively permitting deployment requests on a per cluster basis. For example, systems disclosed herein may apply tenant growth prediction system trained to output a deployment growth classification indicative of a predicted growth of deployments on a node cluster. The system disclosed herein may further utilize the deployment growth classification to determine whether a deployment request may be permitted while maintaining a sufficiently sized capacity buffer to avoid deployment fail-
(Continued)

ures for existing deployments previously implemented on the node cluster. By selectively permitting or denying deployments based on a variety of factors, the systems described herein can more efficiently utilize cluster resources on a per-cluster basis without causing a significant increase in deployment failures for existing customers.

20 Claims, 7 Drawing Sheets

(51) Int. Cl.
    *G06N 20/00*     (2019.01)
    *G06K 9/62*     (2022.01)
    *G06F 8/60*     (2018.01)

(52) U.S. Cl.
    CPC ......... *G06K 9/6256* (2013.01); *G06K 9/6267* (2013.01); *G06N 20/00* (2019.01)

(56) References Cited

U.S. PATENT DOCUMENTS

| | | |
|---|---|---|
| 10,048,996 B1 | 8/2018 | Bell et al. |
| 2016/0043968 A1 | 2/2016 | Vattakkandy et al. |
| 2018/0007128 A1* | 1/2018 | Ramachandra ..... H04L 41/5009 |
| 2019/0042322 A1 | 2/2019 | Calhoun et al. |
| 2019/0317817 A1* | 10/2019 | Brown .................. G06F 9/4856 |
| 2020/0027014 A1* | 1/2020 | Wen ...................... G06F 9/5077 |

OTHER PUBLICATIONS

"Notice of Allowance Issued in European Patent Application No. 20725318.8", dated Nov. 24, 2022, 8 Pages.

\* cited by examiner

ALLOCATING CLOUD RESOURCES IN ACCORDANCE WITH PREDICTED DEPLOYMENT GROWTH

CROSS-REFERENCE TO RELATED APPLICATIONS

This application claims priority to U.S. Provisional Patent Application No. 62/858,190, filed Jun. 6, 2019, which is hereby incorporated by reference in its entirety.

BACKGROUND

A cloud computing system refers to a collection of computing devices capable of providing remote services and resources. For example, modern cloud computing infrastructures often include a collection of physical server devices organized in a hierarchical structure including computing zones, virtual local area networks (VLANs), racks, fault domains, etc. For instance, many cloud computing services are partitioned into clusters of nodes (e.g., node clusters). Cloud computing systems often make use of different types of virtual services (e.g., computing containers, virtual machines) that provide remote storage and computing functionality to various clients or customers. These virtual services can be hosted by server nodes on a cloud computing system.

As cloud computing continues to grow in popularity, managing different types of services and providing adequate cloud-based resources to customers has become increasingly difficult. For example, demand for cloud-based resources often grows over time for certain customers resulting in requests for allocation of additional resources on a cluster. As a result, conventional systems for allocating cloud-based resources often experience deployment failures as a result of current customers requesting deployment of additional services that exceed the resource capacity for the node cluster. Moreover, simply increasing capacity of node clusters by adding new server nodes to accommodate additional deployment requests causes inefficient utilization of cloud computer resources and results in high computing costs for both cloud service providers and customers.

DETAILED DESCRIPTION

Figure 1:
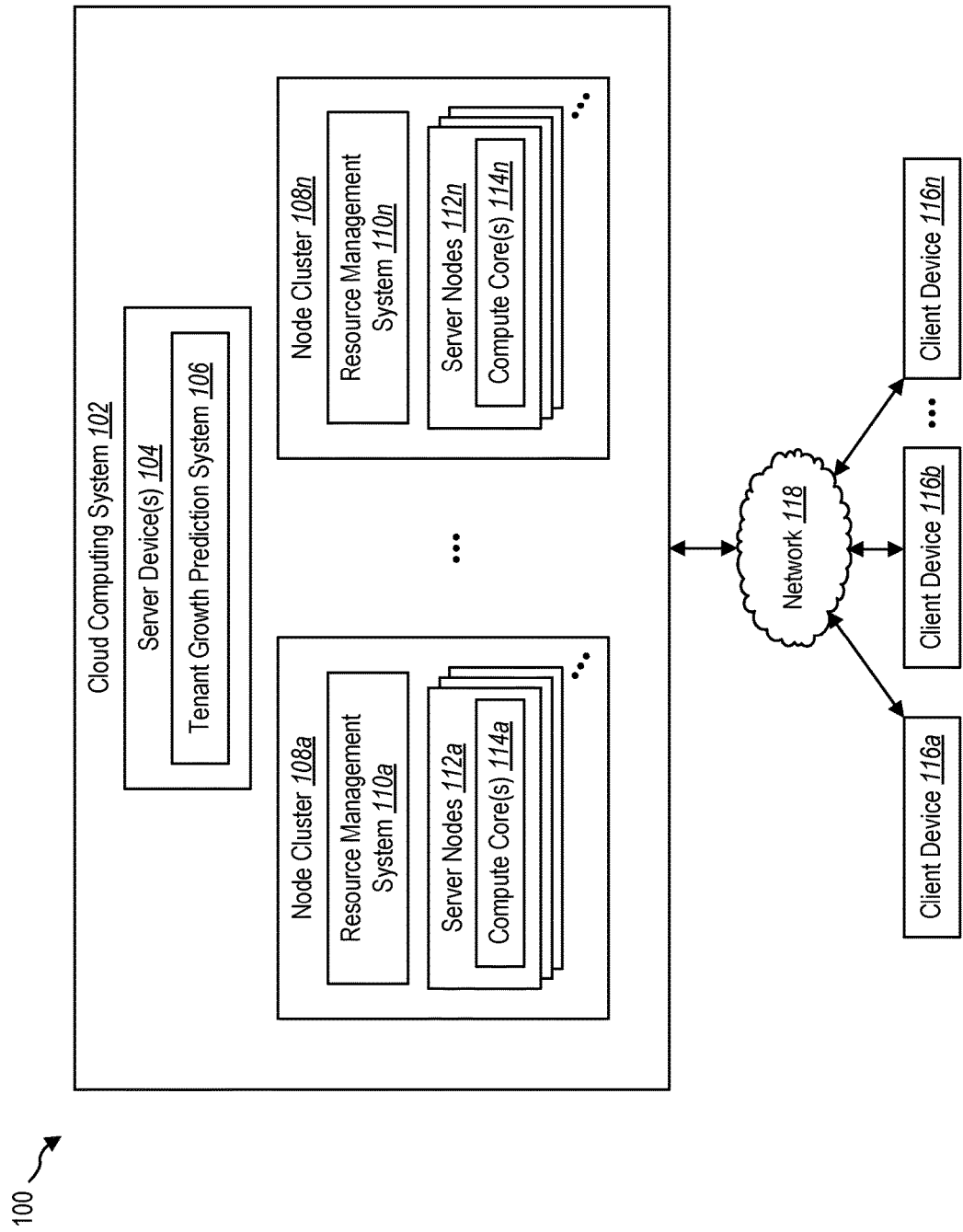
FIG. 1 illustrates an example environment of a cloud computing system including a tenant growth prediction system in accordance with one or more implementations.

The present disclosure is generally related to a tenant growth prediction system and resource management systems for predicting deployment growth (e.g., growth of resource utilization) on one or multiple node clusters and selectively permitting deployment requests based on a predicted deployment growth value. For example, in order to prevent various failures on a node cluster (e.g., service healing failures, maintenance failures, tenant growth failures), many node clusters maintain a capacity buffer that includes cores and nodes of the node cluster that remain empty. This capacity buffer enables a node cluster to tolerate potential hardware and software failures, perform cluster maintenance operations, and accommodate growth of existing deployments that are already located within a node cluster.

In many cases, systems on node clusters attempt to avoid failures on the node cluster by implementing conservative policies regarding whether to permit or deny new deployment requests on the node cluster. Indeed, because a current deployment is often restricted to a specific node cluster, growth of the current deployment is generally placed within the node cluster, which requires that the node cluster include a threshold capacity to accommodate that growth without causing various capacity-related failures. For instance, if an existing deployment attempts to grow and there is not enough capacity within the node cluster on which the deployment is implemented, the growth of the deployment will often fail because existing deployments on one node cluster cannot generally expand to another cluster. Moreover, other capacity related failures may begin to occur as capacity of the node cluster becomes limited.

To accommodate potential growth of current deployments on the node cluster and to prevent allocation failures for those current deployments, many node clusters deny new deployment requests (e.g., deployment requests from new customers) based on very conservative estimations that a current set of deployments on the node cluster will have a high degree of growth. Nevertheless, because tenant growth varies between respective deployments, implementing conservative policies across all clusters of a cloud computing system may result in inefficient utilization of server resources or unnecessarily large buffer capacities.

As will be discussed in further detail below, the systems described herein may determine a predicted deployment growth classification based on a predicted growth of a current set of deployments on a node cluster (e.g., corresponding to a set of existing deployments already located inside the node cluster). The systems may further selectively allocate resources to maintain a capacity buffer threshold on the node cluster. Indeed, as will be discussed in further detail below, the systems described herein may selectively permit or deny new deployment requests in such a way that more efficiently allocates cluster resources while ensuring that a node cluster can accommodate growth of current deployments (e.g., tenant deployments) on the node cluster. The systems disclosed herein can further implement policies to ensure that sufficient capacity buffer is maintained to tolerate potential hardware and software failures and perform various cluster maintenance operations.

By way of example, the tenant growth prediction system can identify a plurality of cluster features for a node cluster of a cloud computing system based on cluster information (e.g., utilization data) for the node cluster. The tenant growth prediction system can further determine a deployment growth classification including a prediction of deployment growth for a current set of deployments on the node cluster based on the identified cluster features. The tenant growth prediction system may provide the deployment growth classification to a resource management system (e.g., a resource allocation engine) for use in determining whether to permit or deny a new deployment request provided to the node cluster.

As another example, a resource management system may receive utilization data for a node cluster representative of a current utilization state for the node cluster. The resource management system may further receive a deployment growth classification including a prediction of deployment growth for the current set of deployments on the node cluster. The resource management system may selectively determine whether to permit or deny received deployment requests based on a combination of the deployment growth classification and a cluster configuration including policies associated with permitting or denying incoming deployment requests for the node cluster (e.g., based on maintaining a minimum capacity buffer threshold for the node cluster).

The present disclosure includes a number of practical applications that provide benefits and/or solve problems associated with selectively permitting and/or denying resource deployment requests in order to maintain a sufficient capacity buffer on a node cluster. For example, by determining a deployment growth classification, the systems described herein can more efficiently utilize computing resources on a per-cluster basis. Indeed, by determining a deployment growth classification that predicts a low deployment growth for a corresponding node cluster, a resource allocation engine may allow deployment of resources in response to a deployment request where conventional deployment systems may deny the deployment request based on an overly conservative deployment policy (e.g., a default deployment policy applied across all clusters of a cloud computing system or across node clusters generally).

In addition to permitting deployments where conventional systems may deny deployment requests based on overly conservative deployment policies, the systems described herein may further reduce deployment failures of both new customers and existing customers by scaling back deployments (e.g., new deployments) where estimated deployment growth is high. For example, by determining a deployment growth classification that predicts a high deployment growth for a current set of deployments, the systems described herein may reduce instances of deployment failures by denying new deployment requests prior to a point when conventional systems may begin denying similar deployment requests.

Moreover, as will be discussed in further detail herein, the systems described herein can further improve resource utilization efficiency on a per-cluster basis by implementing a dynamic cluster configuration based on deployment growth classifications for any number of node clusters. For example, where each of multiple node clusters on a cloud computing system implements a corresponding cluster configuration including general or cluster-specific policies for permitting or denying deployment requests, the systems described herein can generate and provide a deployment growth classification for each of multiple node clusters based on utilization data for the respective node clusters. In one or more implementations, resource management systems on each node cluster can dynamically modify or generate cluster-specific cluster configurations to improve resource utilization efficiency at each of the node clusters.

As illustrated in the foregoing discussion, the present disclosure utilizes a variety of terms to described features and advantages of the systems described herein. Additional detail is now provided regarding the meaning of such terms. For instance, as used herein, a "cloud computing system" refers to a network of connected computing devices that provide various services to computing devices (e.g., customer devices). For instance, as mentioned above, a distributed computing system can include a collection of physical server devices (e.g., server nodes) organized in a hierarchical structure including clusters, computing zones, virtual local area networks (VLANs), racks, fault domains, etc. In addition, it will be understood that while one or more specific examples and implementations described herein relate specifically to "clusters" or "node clusters" of server nodes, features and functionality described in connection with one or more node clusters described herein can similarly relate to racks, regions of nodes, datacenters, or other hierarchical structures of physical server devices. The cloud computing system may refer to a private or public cloud computing system.

In one or more implementations, described herein, cluster information or a cluster utilization status may include, at least in part, utilization data for a node cluster. As used herein, "utilization data" refers to any information associated with allocation or deployment of resources on a cloud computing system. For example, utilization data may refer to a number of nodes and/or node cores on a node cluster having virtual machines or other services deployed thereon. Utilization data may include utilization statistics and trends over any incremental period of time such as resource utilization over multiple days (e.g., cross-day utilization) and/or resource utilization at different time periods within a given day (e.g., intra-day utilization). Utilization data may further include information about fragmentation of capacity within a node cluster, as will be discussed in further detail below.

As used herein, a "deployment," "customer deployment," or "tenant deployment" may refer interchangeably to one or more associated services and allocations provided by a cloud computing system via a node cluster. For example, a deployment may refer to one or multiple services and/or applications provided to a customer (or multiple associated customers) using computing resources of a node cluster. A deployment may refer to one or multiple services provided based on an initial deployment request. In one or more embodiments described herein, a deployment refers exclusively to related services and allocations within a single node cluster.

As used herein, a "current deployment" or "existing deployment" refers to a deployment that has been previously permitted and is currently located within a node cluster. Thus, a "set of existing deployments" or a "set of current deployments" may refer to a set of one or multiple deployments that have been previously permitted and are currently located (and permitted to grow) within a node cluster. In contrast, a "new deployment" refers to a deployment for a new customer, generally discussed in connection with a new deployment request. As used herein, a new deployment request refers to a request to add a new deployment for a new customer to a set of current deployments that are already located on the node cluster.

As used herein, a "core" or "compute core" may refer interchangeably to a computing resource or unit of computing resources provided via a computing node of a cloud computing system. A compute core may refer to a virtual core that make use of the same processor without interfering with other virtual cores operating in conjunction with the processor. Alternatively, a compute core may refer to a physical core having a physical separation from other compute cores. Compute cores implemented on one or across multiple server nodes may refer to a variety of different cores having different sizes and capabilities. Indeed, a given server node may include one or multiple compute cores implemented thereon. Furthermore, a set of multiple cores may be allocated for hosting one or multiple virtual machines or other cloud-based services.

As mentioned above, the systems described herein may facilitate an adequate capacity buffer for one or more node clusters. As used herein, a "buffer capacity" refers to a measure of resource capacity within a node cluster that has not been allocated for one or more resource deployments. For example, a buffer capacity may refer to a minimum threshold of cores and/or nodes that remain empty (e.g., having no virtual machines or other resources deployed thereon). As mentioned above, the buffer capacity may vary between different node clusters based on respective cluster configurations that include policies and rules associated with a minimum threshold of cores and/or nodes that should remain empty on a corresponding node cluster. For example, a cluster configuration may include policies that restrict permitting new deployment requests where permitting one or more new deployment requests may result in causing a buffer capacity for a node cluster to fall below a minimum threshold value. As used herein, a high or increased capacity buffer threshold may refer to a capacity buffer having a higher quantity of cores and/or nodes that remain empty than a low or decreased capacity buffer threshold. Further details in connection with the buffer capacity and cluster configuration are discussed herein.

As used herein, "tenant growth" or "deployment growth" refer generally to an increase or change in utilization of resources on a cloud computing system. For example, deployment growth may refer to a change in a number of cores occupied by virtual machines or other services deployed for a corresponding deployment or tenant. Deployment growth may refer to a change in resource utilization over time including over multiple days and at different time periods within a given day. As used herein, a predicted deployment growth or tenant growth may refer to a predicted change (e.g., an increase) in utilization of resources on a cloud computing system corresponding to a set of current deployments on a node cluster.

Additional detail will now be provided regarding a tenant growth prediction system and one or more resource management systems in relation to illustrative figures portraying example implementations. For example, FIG. 1 illustrates an example environment 100 including a cloud computing system 102. The cloud computing system 102 may include any number of devices. For example, as shown in FIG. 1, the cloud computing system 102 includes one or more server device(s) 104 having a tenant growth prediction system 106 implemented thereon. In addition to the server device(s) 104, the cloud computing system 102 may include any number of node clusters 108a-n. One or more of the node clusters 108a-n may be grouped by geographic location (e.g., a region of node clusters). In one or more embodiments, the node clusters 108a-n are implemented across multiple geographic locations (e.g., at different datacenters or on different racks including one or multiple node clusters).

Each of the node clusters 108a-n may include a variety of server nodes having a number and variety of compute cores. In addition, one or more virtual machines or other cloud computing resources and services may be implemented on the compute cores of the server nodes. For example, as shown in FIG. 1, a first node cluster 108a includes a resource management system 110a tasked with managing resources of the first node cluster 108a. As will be discussed in further detail below (in connection with FIG. 2), the resource management system 110a may include an allocation control engine and a resource allocator thereon for selectively permitting and/or denying deployment requests received for the first node cluster 108a.

As further shown in FIG. 1, the first node cluster 108a may include a first set of server nodes 112a. Each node from the first set of server nodes 112a may include one or more compute cores 114a. One or more of the compute cores 114a may include virtual machines and/or other cloud computing services implemented thereon. Indeed, the first node cluster 108a may include allocated resources and services for any number of customer deployments previously permitted for the first node cluster 108a by the resource management system 110a. The server nodes 112a may include any number and variety of compute cores 114a. Moreover, the compute cores 114a may include any number and variety of virtual machines and other services. As shown in FIG. 1, the cloud computing system 102 may include multiple node clusters 108a-n. Each of the multiple node clusters 108a-n may include resource management systems 110a-n, server nodes 112a-n, and compute cores 114a-n.

As shown in FIG. 1, the environment 100 may include a plurality of client devices 116a-n in communication with the cloud computing system 102 (e.g., in communication with different server nodes 110a-n via a network 118). The client devices 116a-n may refer to various types of computing devices including, by way of example, mobile devices, desktop computers, server devices, or other types of computing devices. The network 118 may include one or multiple networks that use one or more communication platforms or technologies for transmitting data. For example, the network 118 may include the Internet or other data link that enables transport of electronic data between respective client devices 116a-n and devices of the cloud computing system 102.

As mentioned above, one or more resources (e.g., virtual machines) of a first node cluster 108a (or other node cluster from the plurality of node clusters 108a-n) may include resources including one or multiple compute cores occupied or otherwise in use by a customer. For example, a first deployment may refer to one or multiple virtual machines on the same server node or across multiple server nodes that provides access to a large-scale computation application to a user of the first client device 116a. As another example, a second deployment may refer to one or more virtual machines on the same server node or across multiple server nodes that provides access to a gaming application to a second client device 112b (or multiple client devices).

As will be discussed in further detail below, the tenant growth prediction system 106 may collect cluster information including utilization data associated with a quantity of computing resources (e.g., server nodes and compute cores) that are allocated, occupied, or otherwise in use with respect to a set of existing deployments. For example, the tenant growth prediction system 106 may collect utilization data, node cluster properties, and other information associated with the node cluster 108a and determine a deployment growth classification associated with a predicted deployment growth of the current set of deployments for the first node cluster 108a.

In one or more implementations, the tenant growth prediction system 106 provides the deployment growth classification to the resource management system 110a for use in determining whether to permit or deny one or more deployment requests. In particular, the resource management system 110a may determine whether to permit or deny a deployment request based on the deployment growth classification, a current utilization status of the node cluster 108a, and a cluster configuration including policies that define when and under what circumstances deployment requests should be permitted for the first node cluster 108a.

As mentioned above, the tenant growth prediction system 106 can determine and provide deployment growth classification values for any number of node clusters 108a-n. For example, the tenant growth prediction system 106 can determine deployment growth classifications periodically or in response to requests received from the resource management systems 110a-n. The tenant growth prediction system 106 can further provide the determined growth classification values to the resource management system 110a-n implemented thereon to enable the resource management systems 110a-n to individually determine whether to permit or deny deployment requests on a per-cluster basis.

In one or more embodiments, the tenant growth prediction system 106 is implemented as part of a more comprehensive central resource system. For example, the tenant growth prediction system 106 may refer to a subsystem of a central resource system that generates and provides other information such as allocation failure predictions, general capacity and utilization predictions, virtual machine migration impact metrics, or any other information related to the management of resources on the cloud computing system 102. Accordingly, while one or more embodiments described herein relate specifically to a tenant growth prediction system 106 that determines and communicates deployment growth classification values to resource management systems 110a-n, it will be appreciated that one or more additional systems and engines may similarly communicate information to the resource management systems 110a-n for use in managing resources on the respective node clusters 108a-n.

Figure 2:
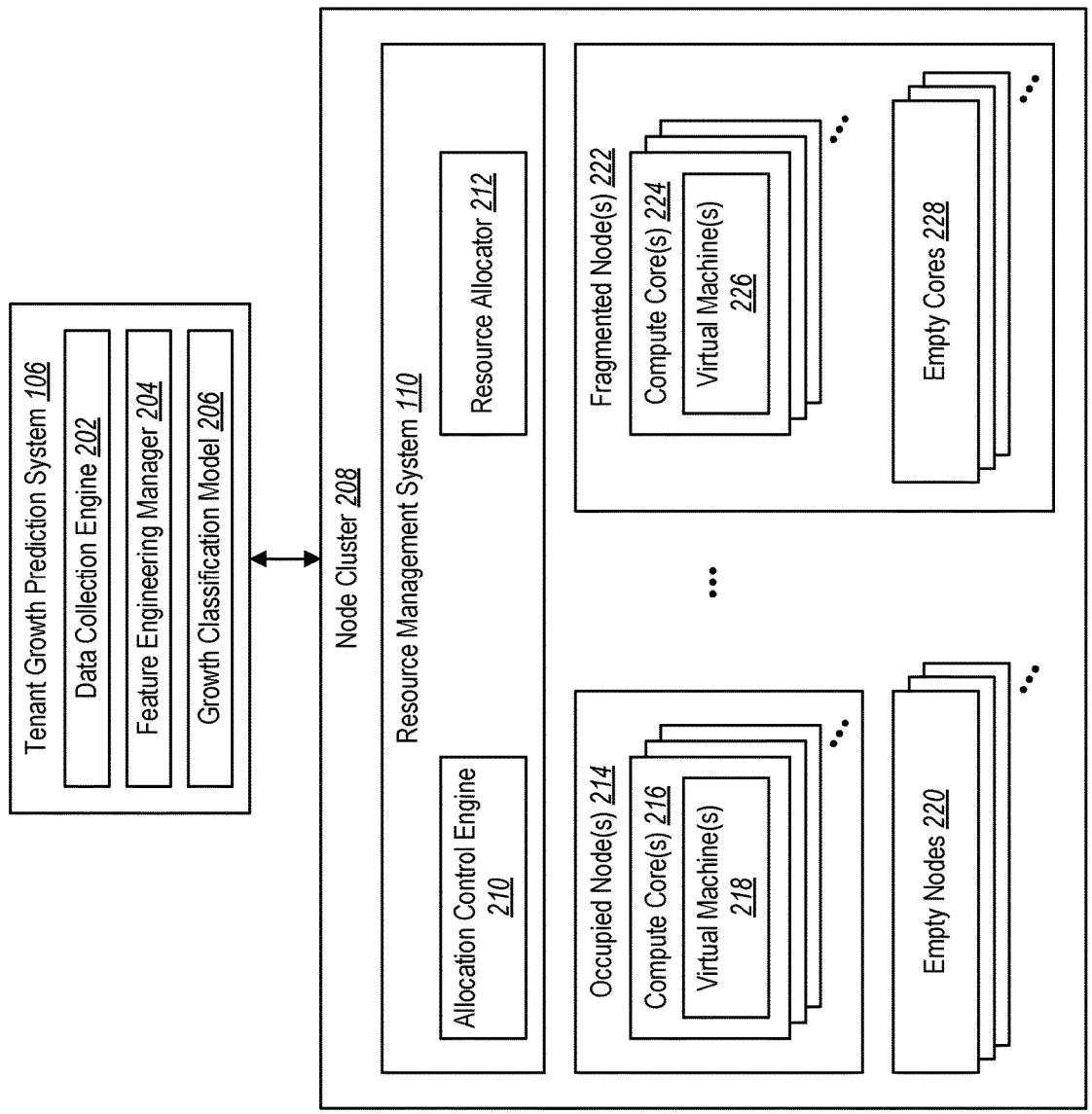
FIG. 2 illustrates an example implementation in which the tenant growth prediction system predicts growth of deployments on a node cluster in accordance with one or more implementations.

FIG. 2 illustrates an example implementation in which the tenant growth prediction system 106 determines and provides a deployment growth classification for an example node cluster. Specifically, FIG. 2 illustrates an example implementation in which the tenant growth prediction system 106 determines a deployment growth classification for a single node cluster 208. Features and characteristics discussed in connection with the illustrated example of FIG. 2 can similarly apply to any of multiple node clusters 108a-n on the cloud computing system 102.

As shown in FIG. 2, the tenant growth prediction system 106 includes a data collection engine 202, a feature engineering manager 204, and a growth classification model 206. Each of these components 202-206 may cooperatively determine a prediction of deployment growth for a current set of deployments on a node cluster 208. As shown in FIG. 2, the node cluster 208 includes a resource management system 110. The resource management system 110 includes an allocation control engine 210 and a resource allocator 212. The resource management system 110 may include similar features as other resource management systems on any of the node clusters of the cloud management system 102.

As further shown, the node cluster 208 may include any number and variety of server nodes. For example, the node cluster 208 may include occupied nodes 214 in which compute cores 216 have virtual machines 218 or other services implemented thereon. The node cluster 208 may also include empty nodes 220 having no virtual machines deployed thereon. The node cluster 208 may further include fragmented nodes 222. As shown in FIG. 2, the fragmented nodes 222 may include occupied compute cores 224 including virtual machines 226 deployed thereon. The fragmented nodes 222 may additionally include empty cores 228 having no virtual machines deployed thereon. As will be discussed in further detail, the tenant growth prediction system 106 may determine capacities associated with a number or percentage of compute cores occupied by virtual machines (and other services) as well as fragmentation characteristics of nodes on the node cluster 208.

Each of the components 202-206 of the tenant growth prediction system 106 may be in communication with each other using any suitable communication technologies. In addition, while the components 202-206 of the tenant growth prediction system 106 are shown to be separate in FIG. 2, any of the components or subcomponents may be combined into fewer components, such as into a single components, or divided into more components as may serve a particular implementation. As an illustrative example, the data collection engine 202 and/or feature engineering manager 204 may be implemented on different server devices of the cloud computing system from the growth classification model 206. As another illustrative example, on or more components 202-206 may be implemented on an edge computing device or other device not implemented as part of the cloud computing system 102.

The components 202-206 of the tenant growth prediction system 106 may include hardware, software, or both. For example, the components of the tenant growth prediction system 106 shown in FIG. 2 may include one or more instructions stored on a computer-readable storage medium and executable by processors of one or more computing devices. When executed by the one or more processors, the computer-executable instructions of one or more computing devices (e.g., server device(s) 104) can perform one or more methods described herein. Alternatively, the components of the tenant growth prediction system 106 can include hardware, such as a special purpose processing device to perform a certain function or group of functions. Additionally, or alternatively, the components 202-206 of the tenant growth prediction system 106 can include a combination of computer-executable instructions and hardware.

An example implementation of the tenant growth prediction system 106 for determining a deployment growth classification for the node cluster 208 is now described in connection with an example framework illustrated in FIG. 3. As mentioned above, and as shown in FIG. 3, the tenant growth prediction system 106 includes a data collection engine 202. The data collection engine 202 may collect or otherwise receive observed cluster data including information about nodes, compute cores, and services deployed on the node cluster 208. The data collection engine 202 can collect information about utilization of resources on the node cluster 208 as well as domain-specific cluster properties of the node cluster 208. Indeed, the data collection engine 202 can collect a variety of different types of cluster data.

As a first example, the data collection engine 202 can collect data associated with utilization of resources on the node cluster 108. For instance, the data collection engine 202 may receive or otherwise obtain utilization statistics at different times over a previous duration of time. This may include identifying a number of occupied nodes, occupied cores, or other utilization metrics at different points. The utilization information may further include fragmentation data such as an indication of how many virtual machines are implemented on different nodes as well as a number of cores occupied by the virtual machines. The utilization information may include snapshots or states of utilization for the node cluster at specific points in time over a previous period of time. For example, the data collection engine 202 may receive or otherwise obtain resource utilization statistics at periodic intervals (e.g., hourly, daily) over a 7-30 day period prior to the tenant growth prediction system 106 generating a prediction of deployment growth for the node cluster 108.

In addition to collecting information about utilization of resources, the data collection engine 202 may further collect cluster property information including platform-specific and/or cluster-specific information associated with a corresponding node cluster 208. As used herein, "cluster property information" or "cluster property data" may refer to any information about settings, properties, or parameters of devices and other domain-specific information about a node cluster. For example, cluster property information may include types of devices (e.g., stock keeping unit (SKU) types, cluster types), an identified region of the node cluster, container policies applicable to one or more devices of the node cluster, and any other properties of the specific node cluster or cloud computing system 102 generally. Cluster property information may further include characteristics about specific tenants or deployments such as account type or offer type. As a further example, cluster property information may include a total capacity (e.g., a total number of nodes and/or cores) of the node cluster.

The data collection engine 202 may collect cluster information, which may include utilization information and/or cluster properties, in a variety of ways. For example, in one or more embodiments, the data collection engine 202 collects utilization information by sampling utilization data at different intervals over a duration of time (e.g., every minute or hour over a period of 7-30 days). Alternatively, the data collection engine 202 may receive utilization information collected by one or more data collection systems maintained on the cloud computing system 102. For instance, a resource management system 110 may maintain and store utilization information and/or cluster property information. As another example, a central resource system may collect utilization data and/or cluster property information and provide the information to the data collection engine 202 on request.

In one or more implementations, the observed cluster data includes raw data including any information associated with utilization and/or cluster properties for the node cluster 208. This may include sampled information over a historical period of time (e.g., 7-30 days) and/or may include information collected at irregular intervals over the period of time. Moreover, in one or more implementations, the data collection engine 202 collects information associated with a subset of nodes and/or cores rather than collecting comprehensive information about each and every core or node of the node cluster 208. Thus, in one or more embodiments, the data collection engine 202 generates refined cluster data that includes a more comprehensive set of information (e.g., utilization data and cluster property data) for the node cluster 210 over the previous duration of time. The data collection engine 202 may generate the refined cluster data in a variety of ways.

For example, in one or more embodiments, the data collection engine 202 performs a statistical analysis and quality measurement of the raw cluster data to identify errors and implications of the observed cluster data. In one or more embodiments, the data collection engine 202 applies an adaptive interpolation approach to fill in missing or incomplete data associated with the utilization and/or cluster properties of the node cluster 208. This may include observing trends of a number of compute cores occupied by virtual machines and other information indicating trends of available compute capacity and fragmentation of the node cluster 208. Indeed, the data collection engine 202 may employ a number of interpolation approaches to generate the refined cluster data.

As an illustrative example in connection with determining cluster utilization over time, where one or more occupied nodes 214 and fragmented nodes 222 or associated compute cores have historically been occupied by the same number of virtual machines for a stable period of time and where a number of empty nodes 220 remains relative unchanged over time, the data collection engine 202 may extrapolate utilization data and cluster property data based on a mean, median, or mode value of core capacity and utilization for the nodes of the node cluster 208.

As another example, where historical data associated with utilization and cluster properties fluctuates in a predictable or periodic way, the data collection engine 202 can apply one or more regression models to predict fluctuating cluster information over time. For example, where utilization statistics may fluctuate (e.g., increase) on weekends as a result of higher utilization by customers for certain types of virtual machines, the data collection engine 202 can apply a regression model to the historical data to extrapolate similar fluctuations of utilization on weekends or on common days week to week.

As a further example, the data collection engine 202 can employ a more complex model to predict non-obvious utilization trends than mean, median, mode, or simple regression models. For example, the data collection engine 202 can employ a machine learning model, algorithm, or other deep learning model trained to extrapolate utilization data and/or node property information where no obvious patterns exist in the utilization of cluster resources over time. In one or more embodiments, the data collection engine 202 employs a processing model trained to extrapolate the refined cluster data by applying each of the processing models (e.g., mean, mode, mean regression, complex model) depending on the trends of portions of the raw data collected by the data collection engine 202.

Using one or more of the extrapolation techniques discussed above, the data collection engine can extrapolate or otherwise generate utilization data over time that reflects a combination of inter-day and intra-day trends. For example, in the example above where utilization increases on the weekend, the data collection engine 202 can extrapolate similar fluctuations on weekends or on similar days of the week. The data collection engine 202 may similarly analyze trends of utilization from hour to hour (or minute to minute) to extrapolate fluctuations of activity at different times within the same day.

In addition to identifying trends of deployment growth corresponding to periodic increases day to day, the data collection engine can further extrapolate or identify growth trends over time. For example, in addition to identifying periodic trends that involve growth and contraction of deployments from day to day, the data collection engine 202 may further identify gradual growth over time as deployment may gradually grow week to week (or other incremental period of time) as more customers access certain services or applications or as existing customers request deployment or allocation of additional resources. Thus, in addition to identifying utilization data and/or cluster property data trends, the data collection engine 202 may also identify trends of gradual growth from day to day and week to week.

Figure 3:
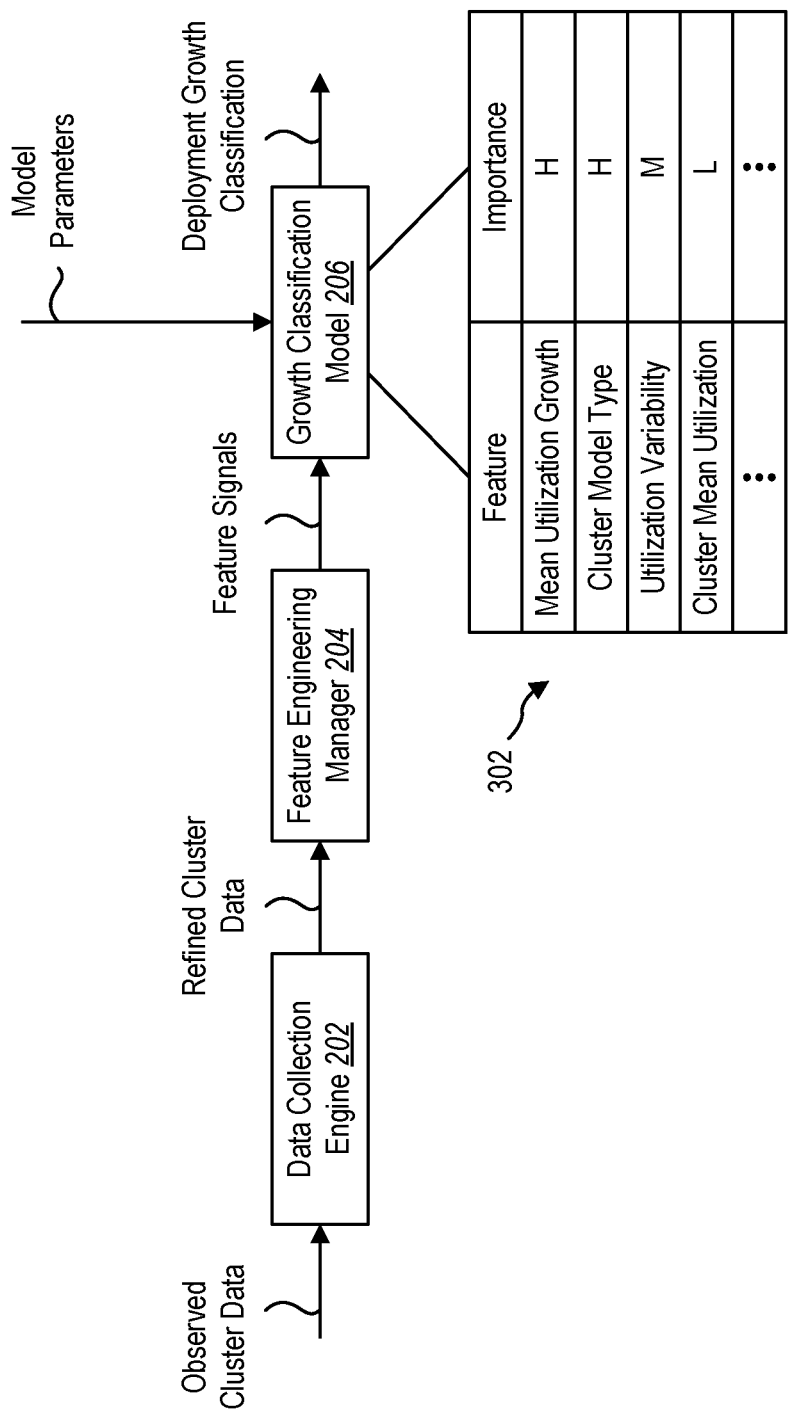
FIG. 3 illustrates an example framework for determining a deployment growth classification in accordance with one or more implementations.

As shown in FIG. 3, the data collection engine 202 can provide refined cluster data to a feature engineering manager 204 for generating feature signals to provide as input to the growth classification model 206. In particular, the feature engineering manager 204 may evaluate the refined cluster data and determine any number of signals that the growth classification model 206 is trained to receive or otherwise recognizes as valid input to use in generating an output that includes a deployment growth classification for the node cluster 208.

For example, the feature engineering manager 204 may generate any number of signals from the refined cluster data that correspond or correlate to a target metric. For example, the feature engineering manager 204 may process the received cluster data and generate any number of feature signals that correspond to a listing or learned set of feature signals that are known to correlate to deployment growth on a given node cluster. In one or more embodiments, the feature engineering manager 204 generates the feature signals based exclusively on the received refined cluster data. Alternatively, in one or more embodiments, the feature engineering manager 204 further refines the refined cluster data to generate any number of feature signals to provide as input to the growth classification model 206.

As shown in FIG. 3, the feature engineering manager 204 can generate a variety of feature signals associated with the node cluster 208. The feature engineering manager 204 can employ a variety of feature engineering approaches, including both data-driven and context-driven approaches. For example, the feature engineering manager 204 can generate signals associate with utilization (e.g., a data-driven approach) and/or signals associated with cluster properties of the node cluster 208 that utilizes domain knowledge of the node cluster, tenants, and/or cloud computing platform.

Indeed, the feature engineering manager 204 can generate any number and variety of feature signals for use in determining a deployment growth classification for the node cluster 208 associated with a prediction of deployment growth over a period of time. Moreover, the feature signals may include a wide variety of signals associated with different trends or data points.

For example, feature signals may include signals associated with tenant information. For example, a feature signal may include one or more metrics of cross-day utilization (e.g., a percentage of used cores divided by a total number of cores within a node cluster). This may include aggregations of data over a period of multiple days, and may refer to metrics such as mean, maximum, minimum, variance, 90 percentile, 75 percentile, or observed trends. Another example feature signal may include metrics of intra-day utilization, which may refer to a percentage of used cores divided by the total cores within a cluster for a given day. This may include aggregations of data over multiple days, and may refer to mean, maximum, minimum, variance, 90 percentile, 75 percentile, or observed trends. Another example feature signal associated with tenants may include an indication of a number of cores and/or nodes utilized by specific tenants over a period of time.

Feature signals may further include signals associated with fabric cluster data. For example, a feature signal may include an indication of an SKU type, which may refer to a hardware generation type, such as Generation 3, Generation 4, Generation 5, etc. A feature signal may further include an indication of cluster type, such as the type of virtual machine or family that can be supported in the node cluster 208. This may include an indication of hardware and software configurations in use by the node cluster 208. A feature signal may further indicate a geographic region of the node cluster (e.g., U.S. East, Europe West).

Other feature signals may be associated with customer data. For example, a feature signal may include an indication of an account type, such as whether a customer is an internal customer, external customer, or may indicate a priority of a particular customer (e.g., high priority, normal priority). Another example feature signal may include an indication of an offer type, such as an internal product or free trial.

One or more feature signals may be associated with platform data. As an example, a feature signal may include a fragmentation index metric associated with the node cluster. For instance, the feature signal may include a number or other value representative of a sum of available cores in each node divided by the total cores from empty nodes. The feature signal may further include aggregated metrics of fragmentation over time, including calculated values of mean, maximum, minimum, variance, 90 percentile, 70 percentile, and other observed trends. As another example, a feature signal may include a container policy deployed on a node cluster indicating how many virtual machines may be deployed in a node as well as which types of virtual machines may be deployed on the node cluster 208.

Indeed, the above instances of feature signals are provided by way of example. Accordingly, it will be appreciated that the feature engineering manager 204 may generate any number of features that the growth classification model 206 is trained to receive as input. In one or more embodiments, the feature engineering manager 204 may be configured to generate new types of feature signals over time as deployment growth trends are observed in connection with different types of utilization data and cluster properties. Indeed, in one or more embodiments, the feature engineering manager 204 may identify specific combinations of feature signals having a high correlation to deployment growth and further generate feature signals that include combinations of multiple signals.

In one or more embodiments, the feature engineering manager 204 generates a set of distinct features associated with the node cluster 208. Nevertheless, in one or more embodiments, the feature engineering manager 204 selectively identifies a subset of the identified feature signals to provide as input to the growth classification model 206. For example, the feature engineering manager 204 may employ a two-step feature selection approach for selecting signals to provide as inputs. As a first step, the feature engineering manager 204 can leverage classic feature selection to select candidate features, such as feature importance ranking, feature filtering via stepwise regression, or feature penalization through regularization. The feature engineering manager 204 can additionally evaluate top feature signals or more important feature signals (e.g., feature signals having a high degree of correlation with tenant growth).

As shown in FIG. 3, the feature engineering manager 204 can provide any number of feature signals to the growth classification model 206. Upon receiving the feature signals, the growth classification model 206 can generate an output including a deployment growth classification. The deployment growth classification may include an indication (e.g., a value or category) associated with a predicted deployment growth for a current set of deployments on the node cluster 208 over a predetermined period of time (e.g., 7 days, 30 days).

In one or more embodiments, the growth classification model 206 generates or otherwise outputs a deployment growth classification including a category that characterizes an expected deployment growth for the node cluster 208. For instance, the growth classification model 206 can generate a classification of low, medium, or high (e.g., associated with low, medium, and high deployment growths). In one or more embodiments, the growth classification model 206 generates a negative classification (e.g., associated with a negative growth of deployments, such as due to scheduled or predicted terminations of virtual machines). Alternatively, the growth classification model 206 can simply generate a numerical value associated with a volume or rate of predicted deployment growth for the node cluster 208.

In one or more implementations, the growth classification model 206 calculates a prediction value based on a combination of feature signals provided as input to the growth classification model 206. The growth classification model 206 may further determine a classification based on determination that the prediction value fits within one of a plurality of ranges corresponding to a category or classification value. Moreover, the growth classification model 206 may determine a classification value based on a predicted intra-day or cross-day growth prediction determined based on the feature signals. By way of example and not limitation, the growth classification model 206 may determine a classification value (ExpansionGrowth) over a predetermined period (t) based on the following equation:

$$ExpansionGrowth_t = \begin{cases} \text{low,} & u_i < \alpha \text{ \% and } u_c < \alpha \text{ \%} \\ \text{high,} & u_i < \beta \text{ \% or } u_c > \beta \text{ \%} \\ \text{medium, Otherwise} \end{cases}$$

Where $u_i$ refers to a maximum intra-day growth prediction over the next t days, $u_c$ refers to a maximum cross-day expansion growth over the next t days, and $\alpha$ and $\beta$ refer to threshold utilization metrics corresponding to respective classification categories.

As shown in FIG. 3, the growth classification model 206 may consider a feature list 302 including features and associated levels of importance. For example, the growth classification model 206 may include a list 302 for reference in comparing received feature signals to corresponding metrics of importance for use in combining the feature signals and generating the deployment growth classification. In the example shown in FIG. 3, the feature list 302 includes associated categories of importance associated with a degree of correlation between the feature signal and rate of growth. Alternatively, the feature list 302 may include other values indicating a measure of importance. In one or more embodiments, the growth classification model 206 generates the feature list 302 based on training data used to train the growth classification model 206 in accordance with one or more embodiments.

In one or more embodiments, the growth classification model 206 refers to a machine learning model, deep learning model, or other type of model for determining the deployment growth classification. In one or more implementations, the growth classification model 206 is trained using a set of model parameters that influence how the growth classification model 206 is trained. For example, the model parameters may include training parameters such as probabilities associated with certain categories or other settings that define how the growth classification model 206 is configured.

In one or more embodiments, the growth classification model 206 includes or utilizes a decision tree model. In this case, the model parameters may include hyperparameters such as a maximum depth (e.g., a maximum depth of a decision tree), a subsample parameter (e.g., a subsample of training instances), a maximum number of leaves (e.g., a maximum number of nodes to be added), and a minimum data requirement for each leaf (e.g., a minimum number of training samples represented by each node). Based on these parameters and using a decision tree model constructed using a set of training instances, the growth classification model 206 can receive a set of feature signals and generate a deployment growth classification including a value associated with a predicted deployment growth for the node cluster 208.

Figure 4:
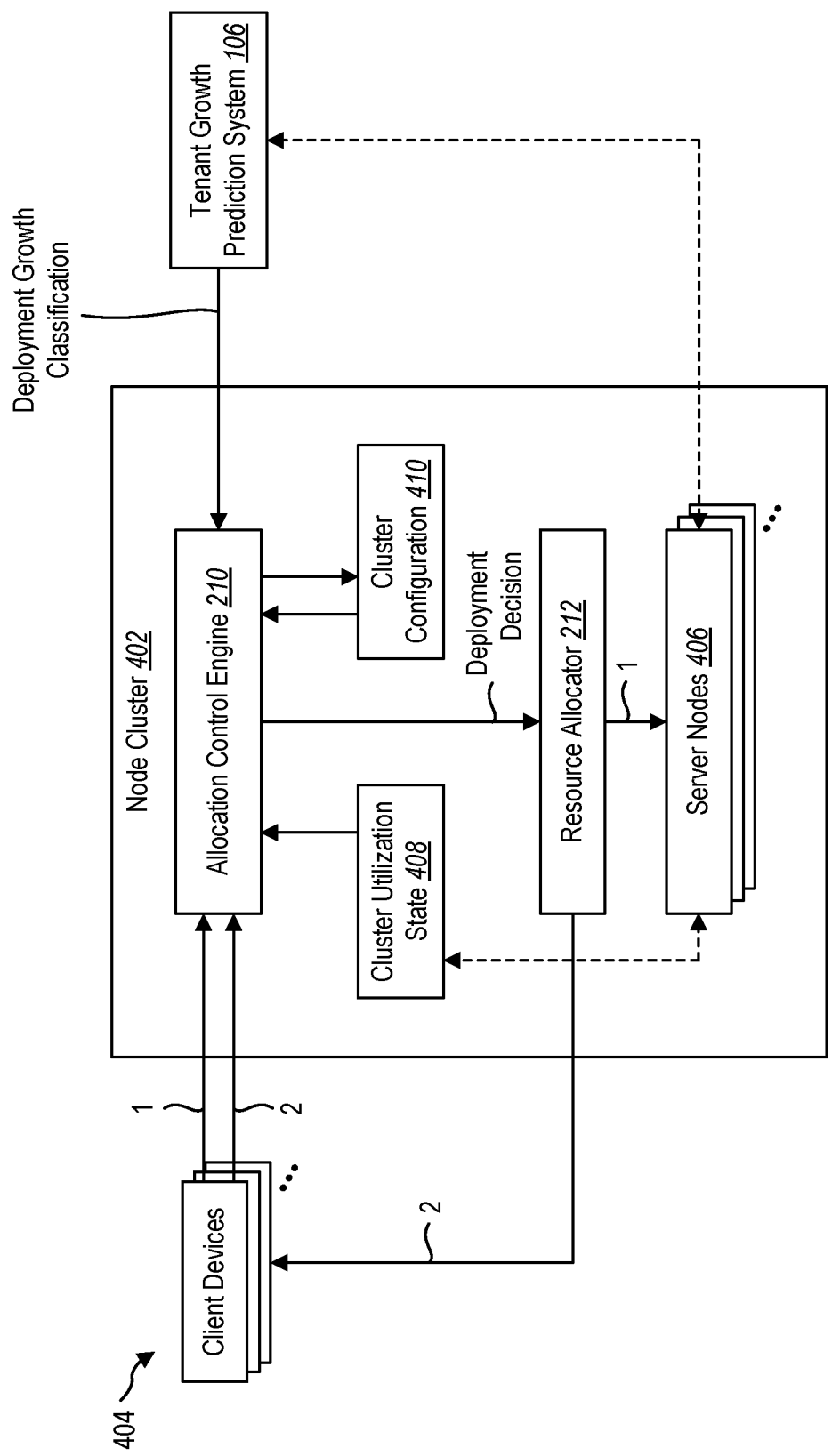
FIG. 4 illustrates an example framework for determine whether to permit or deny a request for a new deployment based on a deployment growth classification.

Upon generating the deployment growth classification, the tenant growth prediction system 106 can provide the deployment growth classification to an allocation control engine 210 for use in determining whether to permit or deny one or more new deployment requests on the node cluster. For example, FIG. 4 illustrates an example implementation of an example node cluster 402 including an allocation control engine 210 and resource allocator 212 implemented thereon and configured to refuse and/or deploy one or more incoming deployment requests received from one or more client devices 404. As shown in FIG. 4, the node cluster 402 includes a plurality of server nodes 406, which may include a variety of empty nodes, occupied nodes, and/or fragmented nodes in accordance with one or more examples discussed above (e.g., as shown in the example node cluster 208 illustrated in FIG. 2).

As shown in FIG. 4, the allocation control engine 210 may receive deployment requests from the plurality of client devices 404. For example, a first device may provide a first deployment request (denoted by "1") and a second device may provide a second deployment request (denoted by "2"). These deployment requests may refer to requests from new or existing customers of the cloud computing system 102 to create new tenant deployments on the node cluster 402.

The allocation control engine 210 may determine whether to permit or deny the deployment requests based on the deployment growth classification received from the tenant growth prediction system 106 as well as additional information associated with the node cluster. As shown in FIG. 4, the allocation control engine 210 may receive a cluster utilization state 408 including a current state of resource utilization for the server nodes 406 of the node cluster 402. The cluster utilization state 408 may include a number or percentage of available nodes and/or compute cores on the server nodes 406. The cluster utilization state 408 may include fragmentation characteristics such as a percentage of empty nodes, a percentage of empty compute cores across the server nodes 406, and/or a fragmentation index value including a calculated measurement of overall fragmentation on the server nodes 406. The cluster utilization state 408 may also include other information representative of a current capacity supply and/or utilization of the server nodes 406 by a set of deployments previously deployed and currently implemented on the node cluster 402.

In addition to the cluster utilization state 408, the allocation control engine 210 may further receive or otherwise access a cluster configuration 410 for the node cluster 402 including policies associated with determining whether to permit or deny new deployment requests. For example, the cluster configuration 410 may include policies to ensure that the node cluster 402 includes a threshold resource buffer. To accomplish this, the cluster configuration 410 may include rules including, by way of example, a minimum number of empty nodes, a minimum number of compute cores, a minimum percentage of compute cores and/or empty nodes, or threshold requirements to ensure that capacity of the server nodes 406 does not exceed a threshold fragmentation of resources. The cluster configuration 410 may further include policies associated with types of virtual machines that can be deployed as well as other rules limiting the types of deployments that the allocation control engine 210 can permit.

In one or more embodiments, the cluster configuration 410 includes a number of static rules to ensure a capacity buffer that enables the node cluster 402 to tolerate a threshold quantity of hardware and/or software failures while ensuring a sufficient capacity of resources to act as a turn-space for various cluster maintenance operations. As an example, the cluster configuration 410 may indicate a threshold utilization state for the node cluster. This may include an indication of a maximum number or percentage of compute cores occupied by a current set of deployments. In addition, or as an alternative, this may include a minimum number or percentage of empty nodes on the node cluster 402.

The cluster configuration 410 may further include rules to tolerate an average or default amount of deployment growth by a current set of deployments on the node cluster 402. In one or more embodiments, the cluster configuration 410 includes rules to accommodate an average amount of growth per cluster or per deployment based on observed deployment growth patterns for multiple node clusters implemented on a cloud computing system. In one or more embodiments, the cluster configuration 410 refers to a default or initial cluster configuration established when the node cluster 402 was initially established or set up.

In one or more embodiments, the allocation control engine 210 modifies the cluster configuration 410 based on a prediction of deployment growth on the node cluster 402. For example, in one or more implementations, the allocation control engine 210 modifies one or more policies set by the cluster configuration 410 based on the deployment growth classification received from the node cluster 402. For instance, where the deployment growth classification indicates a higher than average prediction of tenant growth (e.g., a high growth classification value), the allocation control engine 210 may enforce more restrictive policies in connection with permitting deployment requests. Alternatively, where the deployment growth classification indicates a medium or low prediction of tenant growth (e.g., a medium or low classification value), the allocation control engine 210 may relax certain policies of the cluster configuration 410 in connection with permitting deployment requests.

Accordingly, where the allocation control engine 210 may reject or otherwise deny a first and second deployment request under a default cluster configuration 410, the allocation control engine 210 may modify the cluster configuration 410 based on the deployment growth classification to instead permit deployment of one or both of the received deployment requests. In one or more implementations, modifying the cluster configuration 410 may include modifying a capacity buffer threshold for the node cluster 402. For example, the allocation control engine 210 may increase or decrease the capacity buffer threshold based on the received deployment growth classification.

In one or more embodiments, rather than modifying the cluster configuration 410, the allocation control engine 210 may simply consider the cluster configuration 410 as an input in addition to inputs of the cluster utilization state 408, the deployment growth classification, and the resource request(s). For example, the allocation control engine 210 may implement a set of rules, an algorithm, or other model (e.g., a machine learning model) to determine whether to permit or deny the deployment requests. Indeed, similar to the example discussed above involving modification of the cluster configuration 410, the allocation control engine 210 can similarly apply a more restrictive policy in permitting new deployments when the deployment growth classification indicates a high predicted deployment growth. The allocation control engine 210 can alternatively apply a less restrictive policy in permitting new deployments when the deployment growth classification indicates a medium or low predicted deployment growth.

As shown in FIG. 4, the allocation control engine 210 can provide a deployment decision to the resource allocated 212. The resource allocator 212 may either permit a deployment or deny a deployment in accordance with instructions received from the allocation control engine 210. For example, as shown in FIG. 4, the resource allocator 212 may permit a first deployment (denoted as "1") corresponding to the first received deployment request. As further shown in FIG. 4, the resource allocator 212 may reject a second deployment (denoted as "2") corresponding to the second received deployment request. In denying the deployment request, the resource allocator 212 may provide an indication of the rejected deployment to the client device(s) 404. Alternatively, in one or more implementations, the resource allocator 212 communicates with another node cluster (e.g., an allocation control engine on a different node cluster) or a resource central system of the cloud computing system 102 to determine if the deployment may be performed on the different node cluster.

In one or more embodiments, utilization and cluster property information may update based on one or more additional deployments implemented on the node cluster 402. For example, similar as discussed above, the allocation control engine 210 may permit deployment of the first deployment request. Based on this deployment, the cluster utilization state 408 may receive or otherwise obtain updated utilization information for the node cluster 402. Similarly, the tenant growth prediction system 106 may receive updated information from the node cluster 402. Based on this information, the cluster utilization state 408 may be updated to indicate a current utilization status of the node cluster 402 based on the additional deployment. In addition, the tenant growth prediction system 106 may generate a new updated deployment growth classification based on the new deployment. In addition to updating information about a current set of deployments in response to a new deployment, the cluster utilization state 408 and other information associated with utilization and cluster properties of the node cluster 402 may update periodically (e.g., based on expired deployments, expired virtual machines, detected hardware and software failures, irregular activity by one or more tenants).

In the example shown in FIG. 4, the allocation control engine 210 rejects the second deployment request based on the updated information. In particular, the allocation control engine 210 may receive an updated cluster utilization state that reflects the new deployment. In addition, the allocation control engine 210 may receive an updated deployment growth classification based on utilization information and cluster property information associated with an updated deployment status for the node cluster 402. Moreover, the allocation control engine 210 may further update the cluster configuration 410 (if applicable) and determine to permit or reject the second deployment based on the updated information. As shown in the example shown in FIG. 2, the allocation control engine 210 instructs the resource allocator 212 to reject the deployment request.

Figure 5:
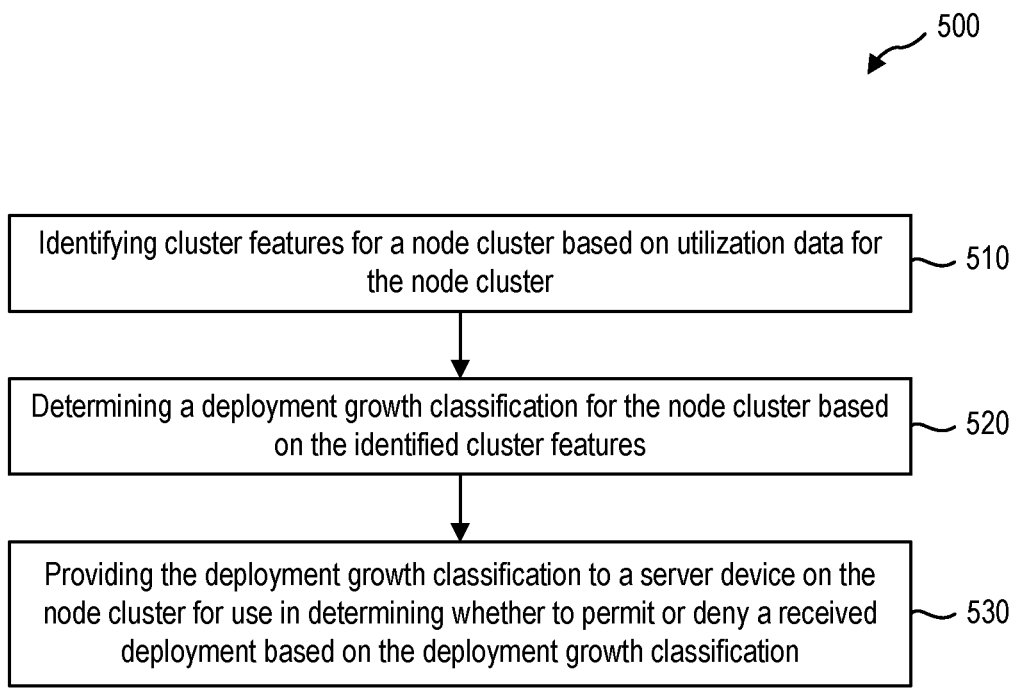
FIG. 5 illustrates an example method for implementing the tenant growth prediction system in accordance with one or more implementations.
Figure 6:
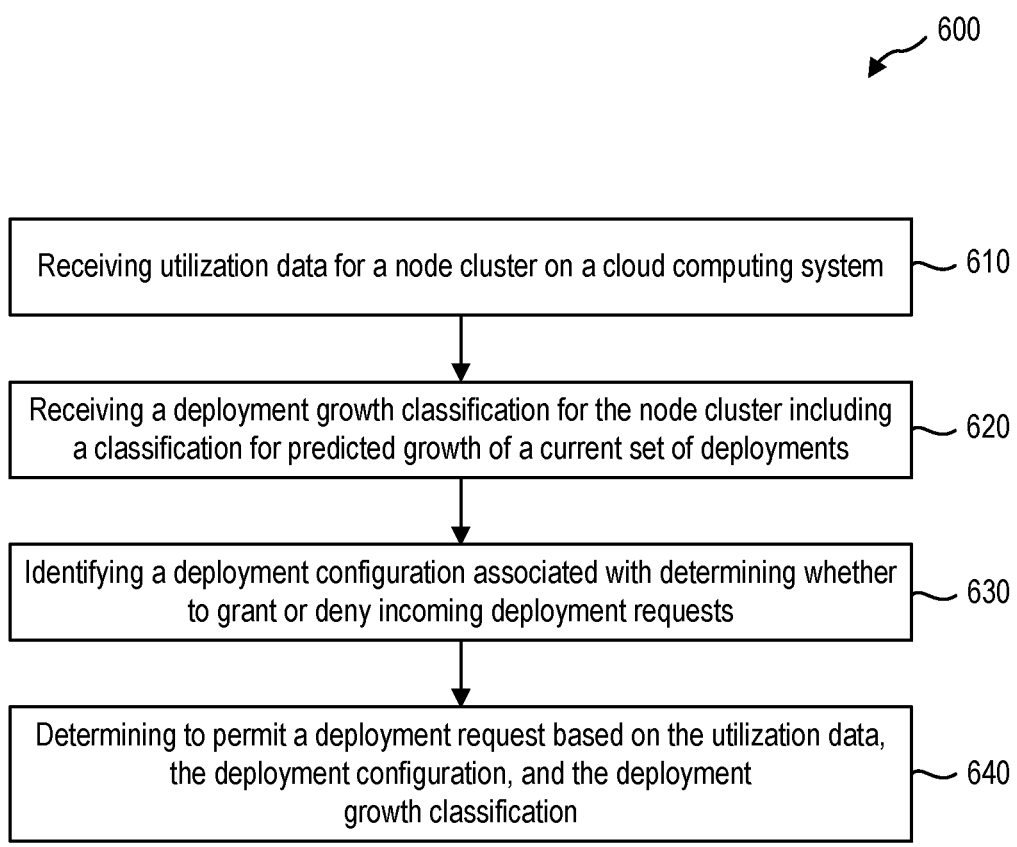
FIG. 6 illustrates another example method for implementing the tenant growth prediction system in accordance with one or more implementations.

Turning now to FIGS. 5-6, these figures illustrate example flowcharts including series of acts for determining whether to permit or deny deployment requests on a per-cluster basis.

While FIGS. 5-6 illustrate acts according to one or more embodiments, alternative embodiments may omit, add to, reorder, and/or modify any of the acts shown in FIGS. 5-6. The acts of FIGS. 5-6 can be performed as part of a methods. Alternatively, a non-transitory computer-readable medium can include instructions that, when executed by one or more processors, cause a computing device to perform the acts of FIG. 5. In still further embodiments, a system can perform the acts of FIG. 5.

FIG. 5 illustrates a series of acts 500 to facilitate determining and utilizing a deployment growth classification in accordance with one or more embodiments described herein. As shown in FIG. 5, the series of acts 500 includes an act 510 of identifying cluster features for a node cluster based on utilization data for the node cluster. For example, in one or more embodiments, the act 510 includes identifying a plurality of cluster features for a node cluster based on utilization data for the node cluster where the node cluster includes a grouping of server nodes on a cloud computing system.

In one or more embodiments, the utilization data include one or more of a number or percentage of compute cores occupied by the existing set of deployments, a number or percentage of empty nodes from the node cluster, or a fragmentation metric for the node cluster based on a number of total available cores on the node cluster and a number of available cores on empty nodes from the node cluster. In one or more embodiments, the utilization data includes intra-day utilization data for the existing set of deployments on the node cluster and/or cross-day utilization data for the existing set of deployments on the node cluster.

In one or more embodiments, identifying the plurality of cluster features is based on cluster properties of the node cluster. For example, cluster properties may include one or more hardware types of nodes on the node cluster, types of cloud computing resources supported by the node cluster, a geographic region associated with the node cluster, one or more account types associated with the existing set of deployments, or one or more offer types associated with the existing set of deployments.

The series of acts 500 may further include an act 520 of determining a deployment growth classification for the node cluster based on the identified cluster features. For example, in one or more embodiments, the act 520 includes determining a deployment growth classification for the node cluster based on the identified plurality of cluster features where the deployment growth classification includes a classification for predicted growth of an existing set of deployments on the node cluster.

In one or more embodiments, identifying the plurality of cluster features includes collecting historical utilization data for the node cluster and constructing the plurality of cluster features based on the historical utilization data for the node cluster where the plurality of cluster features comprising feature signals from a collection of feature signals known to correlate with growth of deployments on a given node cluster. In one or more embodiments, identifying plurality of cluster features includes collecting raw utilization data for the node cluster and extrapolating the historical utilization data based on observed patterns of the raw utilization data over previous periods of time.

In one or more embodiments, determining the deployment growth classification for the node cluster includes providing the plurality of cluster features as input signals to a deployment growth prediction model trained to generate an output including a predicted growth of existing deployments on a given node cluster. In one or more embodiments, the deployment growth prediction model includes a machine learning model trained to generate the output based on historical utilization data for a plurality of node clusters and associated deployment growth for the plurality of node clusters.

In one or more embodiments, the deployment growth classification for predicted growth is based on a predicted utilization growth of the existing set of deployments on the node cluster over a predetermined period of time. In addition, or as an alternative, the deployment growth classification may include a classification for predicted growth based on predicted fluctuations of utilization growth of the existing set of deployments on the node cluster over the predetermined period of time.

The series of acts 500 may also include an act 530 of providing the deployment growth classification to a server device on the node cluster for use in determining whether to permit or deny a received deployment based on the deployment growth classification. For example, in one or more embodiments, the act 530 includes providing the deployment growth classification to a server device on the node cluster for use in determining whether to permit or deny a received deployment request based on the deployment growth classification and a cluster configuration for the node cluster where the cluster configuration includes one or more policies associated with whether to permit or deny incoming deployment requests on the node cluster.

FIG. 6 illustrates a series of acts 600 for determining whether to permit or deny a deployment request in accordance with one or more embodiments described herein. As shown in FIG. 6, the series of acts 600 includes an act 610 of receiving utilization data for a node cluster on a cloud computing system. For example, in one or more embodiments, the act 610 includes receiving utilization data for a node cluster on a cloud computing system, wherein the node cluster comprises a plurality of associated server nodes on the cloud computing system The series of acts 600 may further include an act 620 of receiving a deployment growth classification for the node cluster including a classification for predicted growth of a current set of deployments. For example, in one or more embodiments, the act 620 includes receiving a deployment growth classification for the node cluster, the deployment growth classification comprising a classification for predicted growth of an existing set of deployments on the node cluster.

The series of act 600 may also include an act 630 of identifying a cluster configuration associated with determining whether to grant or deny incoming deployment requests. For example, in one or more embodiments, the act 630 includes identifying a cluster configuration associated with determining whether to permit or deny incoming deployment requests on the node cluster.

In one or more embodiments, the cluster configuration includes instructions associated with permitting or denying incoming deployment requests based on whether the utilization data for the node cluster exceeds a threshold utilization state for the node cluster where the threshold utilization state includes one or more of a maximum number or percentage of compute cores occupied by the existing set of deployments on the node cluster or a minimum number or percentage of empty nodes on the node cluster.

In one or more embodiments, the cluster configuration includes a capacity buffer threshold associated with a minimum capacity of compute cores on the node cluster. Further, in one or more embodiments, identifying the cluster configuration includes modifying the capacity buffer threshold based on the received deployment growth classification. In one or more embodiments, modifying the capacity buffer threshold includes decreasing the capacity buffer threshold based on a deployment growth classification associated with a prediction of low growth of the existing set of deployments on the node cluster. Alternatively, modifying the capacity buffer threshold may include increasing the capacity buffer threshold based on a deployment growth classification associated with a prediction of high growth of the existing set of deployments on the node cluster.

In one or more embodiments, the series of acts 600 includes identifying a cluster configuration including a capacity buffer threshold associated with a minimum capacity of compute cores on the node cluster and determining a modified cluster configuration based on the received deployment growth classification where determining whether to permit or deny the received deployment request is further based on the modified cluster configuration.

The series of acts 600 may additionally include an act 640 of determining to permit a deployment request based on the utilization data, the cluster configuration, and the deployment growth classification. For example, in one or more embodiments, the act 640 includes permitting a received deployment request based on the received utilization data, the cluster configuration, and the deployment growth classification.

In one or more embodiments, the series of acts 600 includes updating the utilization data for the node cluster based on a new deployment for the received deployment request in addition to the existing set of deployments on the node cluster. The series of acts 600 may further include denying an additional received deployment request based on the updated utilization data and the deployment growth classification.

In one or more embodiments, determining the deployment growth classification includes providing the plurality of cluster features as input signals to a deployment growth prediction model trained to generate an output including a predicted growth of existing deployments on a given node cluster and receiving, from the deployment growth prediction model, the deployment growth classification for the node cluster.

Figure 7:
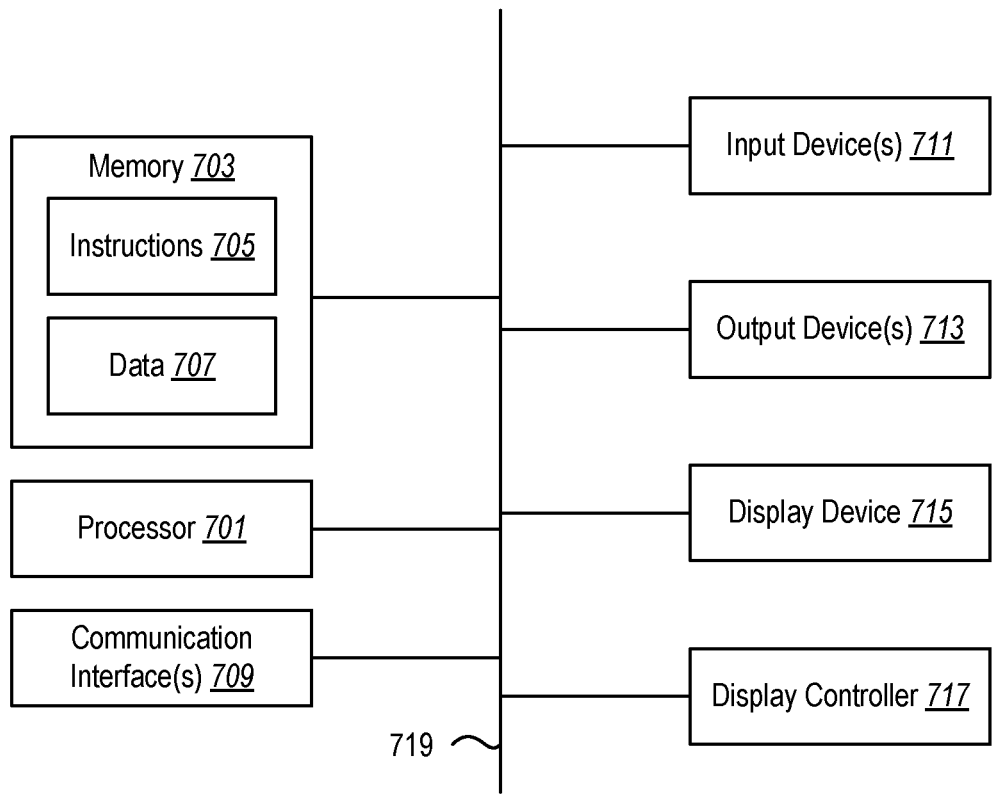
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   identifying a plurality of cluster features for a plurality of node clusters based on utilization data for the plurality of node clusters, wherein the plurality of node clusters comprises a first grouping of server nodes and a second grouping of server nodes on a cloud computing system, wherein a first set of policies associated with whether to permit or deny incoming deployment requests is applied to the first grouping of server nodes and the same first set of policies is applied to the second grouping of server nodes, and wherein the first grouping of server nodes differs from the second grouping of server nodes;
   determining a first deployment growth classification for a first node cluster of the plurality of node clusters based on a first identified plurality of cluster features associated with the first grouping of server nodes, the first deployment growth classification comprising a first classification for predicted growth of a first existing set of deployments on the first node cluster;
   determining a second deployment growth classification for a second node cluster of the plurality of node clusters based on a second identified plurality of cluster features associated with the second grouping of server nodes, the second deployment growth classification comprising a second classification for predicted growth of a second existing set of deployments on the second node cluster;
   providing the first deployment growth classification to a first server device on the first node cluster, wherein providing the first deployment growth classification to the first server device causes the first server device to modify the first set of policies to a second set of derived policies on the first node cluster; and
   providing the second deployment growth classification to a second server device on the second node cluster, wherein providing the second deployment growth classification to the second server device causes the second server device to modify the first set of policies to a third set of derived policies on the second node cluster, wherein the second set of derived policies differs from the third set of derived policies.

2. The method of claim 1, wherein determining the first deployment growth classification for the first node cluster comprises providing a first set of cluster features from the plurality of cluster features as input signals to a deployment growth prediction model trained to generate an output including a predicted growth of existing deployments on a given node cluster.

3. The method of claim 2, wherein the deployment growth prediction model comprises a machine learning model trained to generate the output based on historical utilization data for the plurality of node clusters and associated deployment growth for the plurality of node clusters.

4. The method of claim 1, wherein the utilization data comprises:
   a number or percentage of compute cores occupied by each of the first existing set of deployments and the second existing set of deployments;
   a number or percentage of empty nodes from each of the first node cluster and the second node cluster; and
   a fragmentation metric for the first node cluster based on a number of total available cores on each of the first node cluster and the second node cluster and a number of available cores on empty nodes from each of the first node cluster and the second node cluster.

5. The method of claim 1, wherein the utilization data comprises:
   intra-day utilization data for the first existing set of deployments and the second existing set of deployments; and
   cross-day utilization data for the first existing set of deployments and the second existing set of deployments.

6. The method of claim 1, wherein identifying the plurality of cluster features is further based on cluster properties of the first node cluster and the second node cluster.

7. The method of claim 6, wherein the cluster properties comprise one or more of:
   hardware types of nodes on each of the first node cluster and the second node cluster;
   types of cloud computing resources supported by each of the first node cluster and the second node cluster;
   a geographic region associated with each of the first node cluster and the second node cluster;
   one or more account types associated with the first existing set of deployments and the second existing set of deployments; or
   one or more offer types associated with the first existing set of deployments and the second existing set of deployments.

8. The method of claim 1, wherein identifying the plurality of cluster features comprises:
   collecting historical utilization data for each of the first node cluster and the second node cluster; and
   constructing the plurality of cluster features based on the historical utilization data for each of the first node cluster and the second node cluster, the plurality of cluster features comprising feature signals from a collection of feature signals known to correlate with growth of deployments on a given node cluster.

9. The method of claim 8, wherein identifying the plurality of cluster features comprises:

collecting raw utilization data for the first node cluster and the second node cluster; and extrapolating the historical utilization data based on observed patterns of the raw utilization data over previous periods of time.

10. The method of claim 1, wherein the first deployment growth classification comprises a classification for predicted growth based on one or more of:

predicted utilization growth of the first existing set of deployments on the first node cluster over a predetermined period of time; or predicted fluctuations of utilization growth of the first existing set of deployments on the first node cluster over the predetermined period of time.

11. The method of claim 1, wherein the first set of policies comprise a requirement to include a threshold resource buffer that indicates a minimum number of empty nodes having no virtual machines deployed thereon.

12. A method, comprising:

receiving utilization data for a node cluster on a cloud computing system, wherein the node cluster comprises a plurality of associated server nodes on the cloud computing system;

receiving a deployment growth classification for the node cluster, the deployment growth classification comprising a classification for predicted growth of an existing set of deployments on the node cluster;

identifying a cluster configuration including one or more policies associated with determining whether to permit or deny incoming deployment requests on the node cluster, wherein the one or more policies are associated with maintaining one or more threshold levels of compute core capacity on the node cluster;

based on the received deployment growth classification for the node cluster, modifying the one or more policies of the cluster configuration by increasing or decreasing the one or more threshold levels of compute core capacity; and permitting a received deployment request based on the received utilization data and the modified one or more policies of the cluster configuration based on the received deployment growth classification.

13. The method of claim 12, further comprising:

updating the utilization data for the node cluster based on a new deployment for the received deployment request in addition to the existing set of deployments on the node cluster; and denying an additional received deployment request based on the updated utilization data and the received deployment growth classification.

14. The method of claim 12, wherein the cluster configuration comprises instructions associated with permitting or denying incoming deployment requests based on whether the utilization data for the node cluster exceeds a threshold utilization state for the node cluster, the threshold utilization state including one or more of:

a maximum number or percentage of compute cores occupied by the existing set of deployments on the node cluster; or a minimum number or percentage of empty nodes on the node cluster.

15. The method of claim 12, wherein the cluster configuration comprises a capacity buffer threshold associated with a minimum capacity of empty nodes on the node cluster, and wherein identifying the cluster configuration comprises modifying the capacity buffer threshold based on the received deployment growth classification.

16. The method of claim 15, wherein modifying the capacity buffer threshold comprises:

decreasing the capacity buffer threshold based on a deployment growth classification associated with a prediction of low growth of the existing set of deployments on the node cluster; or increasing the capacity buffer threshold based on a deployment growth classification associated with a prediction of high growth of the existing set of deployments on the node cluster.

17. A system, comprising:

one or more processors;

memory in electronic communication with the one or more processors; and instructions stored in the memory, the instructions being executable by the one or more processors to:

identify a plurality of cluster features for a plurality of node clusters based on utilization data for the plurality of node clusters, wherein the plurality of node clusters comprises a first grouping of server nodes and a second grouping of server nodes on a cloud computing system, wherein a first set of policies associated with whether to permit or deny incoming deployment requests is applied to the first grouping of server nodes and the same first set of policies is applied to second grouping of server nodes, and wherein the first grouping of server nodes differs from the second grouping of server nodes;

determine a first deployment growth classification for a first node cluster of the plurality of node clusters based on a first identified plurality of cluster features associated with the first grouping of server nodes, the first deployment growth classification comprising a first classification for predicted growth of a first existing set of deployments on the first node cluster;

determine a second deployment growth classification for a second node cluster of the plurality of node clusters based on a second identified plurality of cluster features associated with the second grouping of server nodes, the second deployment growth classification comprising a second classification for predicted growth of a second existing set of deployments on the second node cluster;

provide the first deployment growth classification to a first server device on the first node cluster, wherein providing the first deployment growth classification to the first server device causes the first server device to modify the first set of policies to a second set of derived policies on the first node cluster; and provide the second deployment growth classification to a second server device on the second node cluster, wherein providing the second deployment growth classification to the second server device causes the second server device to modify the first set of policies to a third set of derived policies on the second node cluster, wherein the second set of derived policies differs from the third set of derived policies.

18. The system of claim 17, wherein determining the first deployment growth classification for the plurality of node clusters comprises:

providing the plurality of cluster features as input signals to a first deployment growth prediction model trained to generate an output including a predicted growth of existing deployments on a given node cluster; and receiving, from the first deployment growth prediction model, the first deployment growth classification for the first node cluster.

19. The system of claim 17, wherein the utilization data comprises one or more of:
- a number or percentage of compute cores occupied by the first existing set of deployments;
- a number or percentage of empty nodes from the first node cluster; or
- a fragmentation metric for the first node cluster based on a number of total available cores on the first node cluster and a number of available cores on empty nodes from the first node cluster.

20. The system of claim 17, wherein identifying the plurality of cluster features is further based on cluster properties of the first node cluster, and wherein the cluster properties comprise one or more of:
- hardware types of nodes on the first node cluster;
- types of cloud computing resources supported by the first node cluster;
- a geographic region associated with the first node cluster;
- one or more account types associated with the first existing set of deployments; or
- one or more offer types associated with the first existing set of deployments.

* * * * *